Figure 1:
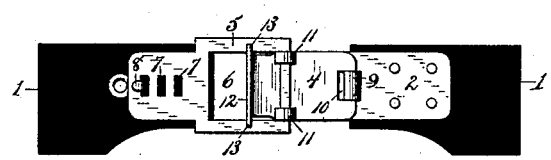

(No Model.)

F. F. MEEKER.
FASTENER FOR SHOES, GLOVES, &c.

No. 342,372. Patented May 25, 1886.

Witnesses,
C. C. Perkins.
C. E. Ruggles.

Inventor,
Fred F. Meeker
By A. M. Wooster
Atty.

N. PETERS, Photo-Lithographer, Washington, D. C.

UNITED STATES PATENT OFFICE.

FRED F. MEEKER, OF WESTPORT, CONNECTICUT.

FASTENER FOR SHOES, GLOVES, &c.

SPECIFICATION forming part of Letters Patent No. 342,372, dated May 25, 1886.

Application filed February 1, 1886. Serial No. 190,398. (No model.)

*To all whom it may concern:*

Be it known that I, FRED F. MEEKER, a citizen of the United States, residing at Westport, in the county of Fairfield and State of Connecticut, have invented certain new and useful Improvements in Fasteners for Shoes, Gloves, &c; and I do hereby declare the following to be a full, clear, and exact description of the invention, such as will enable others skilled in the art to which it appertains to make and use the same.

My invention has for its object to provide a fastener for shoes, gloves, &c., which shall be simple and economical in construction, impossible to get out of order, and which may be adjusted to draw the parts more or less closely together. With these ends in view I have devised the novel fastener of which the following description, in connection with the accompanying drawings, is a specification, numbers being used in the drawings to indicate the several parts of the device.

Figure 3:
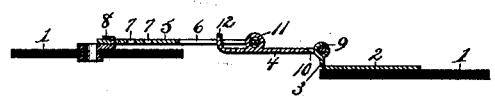
Figure 2:
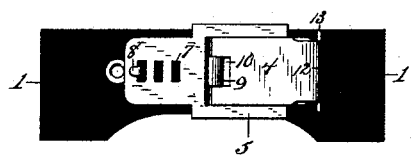

Figure 1 is a plan view of the device in the opened position, but with the fastener attached to the hook. Fig. 2 is a similar view showing the parts in the closed position; Fig. 3, a section corresponding with Fig. 1—that is, showing the parts in the opened position; and Fig. 4, a section corresponding with Fig. 2—that is, showing the parts in the closed position.

1 indicates portions of the article upon which the fastener is used, which may be a shoe, glove, or any similar article, and any number of fasteners may be used upon the same article. 2 is a plate riveted to one side of the article, and having an angular projection, 3, to which the turning plate 4 is hinged. 5 is a plate having an opening, 6, at the center for a purpose presently to be explained, which is hinged to the turning plate near its opposite end. The outer edge of plate 5 is provided with slots 7, adapted to engage a hook, 8, which is riveted to the opposite side of the article. I have described these parts as hinged together, but do not wish to limit myself to any special means of joining them.

In practice, plate 2 is provided at its inner end with a lip, 9, made integral therewith, which is passed through an opening, 10, near the edge of the turning plate, and is then bent around the edge of said plate to form the hinge. I also provide similar lips, 11, on the turning plate, which are bent around the edge of plate 5, thus hinging the two plates together. This is a simple and perfectly practical means of joining the plates. My invention, however, is not limited to the special means by which they are joined, as I contemplate hinging them in any suitable manner. At the end of the turning plate, opposite to plate 2, I provide a finger-piece, 12, for convenience in turning said plate to its closed position.

If preferred, lugs 13 may be provided at the edges of the finger-piece to prevent it from passing through the opening in plate 5.

Figure 4:
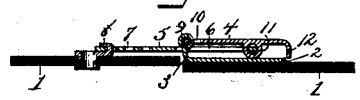

The operation is as follows: When it is desired to fasten the shoe, glove, or other article, one of the slots in plate 5 is engaged with hook 8. To draw the parts of the article together the turning plate is lifted by the finger-piece and swung completely over on the pivots connecting it to plates 2 and 5, plate 5 being lifted up and passing completely over plate 2, as shown in Figs. 2 and 4. In doing this plate 4 changes ends, so that in the closed position plate 2 lies under it, the outer end of the latter passing up through opening 6 in plate 5, which is provided for that purpose. This change of position of plate 4 acts to draw each side of the article over toward the opposite side—that is, toward each other—a distance equal to the distance between the two hinges of plate 4.

It will be apparent that the details of construction may be widely varied without departing from the spirit of my invention.

I claim—

1. A fastener for shoes, gloves, &c., consisting of a plate, 2, riveted to one side of the article, a hook riveted to the other side thereof, a plate, 5, having slots adapted to engage said hook, and a turning plate hinged to plates 2 and 5 and adapted to be swung over so as to change ends, thus drawing the opposite sides of the article toward each other.

2. Plate 2 and hook 8, in combination with plate 5, having opening 6 and slots 7, and plate 4, hinged to plates 2 and 5, substantially as described.

3. Hook 8, plate 2, having lip 9, and plate 5, having opening 6 and slots 7, in combination with plate 4, having opening 10 and lips 11.

4. Plate 2, hook 8, and plate 5, having a central opening and slots to engage the hook, in combination with plate 4, hinged to plates 2 and 5 and provided with a finger-piece, 12, as and for the purpose set forth.

In testimony whereof I affix my signature in presence of two witnesses.

FRED F. MEEKER.

Witnesses:
A. M. WOOSTER,
C. E. RUGGLES.